United States Patent [19]

Ramos et al.

[11] Patent Number: 5,896,533
[45] Date of Patent: Apr. 20, 1999

[54] ACCESSING INTERNETS WORLD-WIDE WEB THROUGH OBJECT LINKING AND EMBEDDING TECHNOLOGY

[75] Inventors: Daniel Ramos, Beaverton; George W. Cox; Kevin Altis, both of Portland, all of Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/498,928

[22] Filed: Jul. 6, 1995

[51] Int. Cl.$^6$ .......................... G06F 15/163; G06F 9/00; G06F 9/46
[52] U.S. Cl. .............. 395/680; 395/200.33; 395/200.48
[58] Field of Search .................. 395/680, 681, 395/682, 200.33, 200.48

[56] References Cited

U.S. PATENT DOCUMENTS

| | | | |
|---|---|---|---|
| 5,187,787 | 2/1993 | Skeen et al. | 395/680 |
| 5,278,955 | 1/1994 | Forte et al. | 395/200 |
| 5,301,268 | 4/1994 | Takeda et al. | 395/680 |
| 5,448,738 | 9/1995 | Good et al. | 395/680 |
| 5,530,852 | 6/1996 | Meske, Jr. et al. | 395/600 |
| 5,553,239 | 9/1996 | Health et al. | 395/187.01 |

OTHER PUBLICATIONS

Sara Williams and Charlie Kindel, Developer Relations Group, Microsoft Corporation, pp. 1–18, Oct. 1994.

Object Linking and Embedding Programmer's Reference Version 1.0, MicroSoft Press, Jan. 1992.

Primary Examiner—Alvin E. Oberley
Assistant Examiner—Peter Stecker
Attorney, Agent, or Firm—Blakely, Sokoloff, Taylor & Zafman LLP

[57] ABSTRACT

The method and apparatus of the present invention allows for all applications running on a computer which conform to the Object Linking and Embedding Application Programming Interface (OLE API) to automatically become capable of accessing World-Wide Web (WWW) files of arbitrary type. The standard OLE API is extended to utilize Uniform Resource Locators (URL), the WWW global naming convention.

19 Claims, 8 Drawing Sheets

Insert WWW Document

URL
http://wwwsurveyor.intel.com:880/project

Description
Architecture Specification

⊘ Display Description   ○ Display URL   ○ Display Document   ○ Display Picture

ACCESSING INTERNETS WORLD-WIDE WEB THROUGH OBJECT LINKING AND EMBEDDING TECHNOLOGY

BACKGROUND OF THE INVENTION (1). Field of the Invention

The present invention is related to the field for referencing a file in a network, more specifically, for extending the Windows® Object Linking and Embedding (OLE) functionality to transparently reference files residing in the Internet's World-Wide Web (WWW).

(2) Prior Art

World-Wide Web (WWW) is a fully multimedia-enabled hypertext system used for navigating the Internet. WWW may cope with any type of data which may be stored on computers, and may be used with an Internet connection and a WWW browser. WWW is made up of hundreds of thousands of interconnected pages or documents which can be displayed on a computer monitor. Each page can have connections to other pages which may be held on any computer connected to the Internet.

WWW is based on the concept of hypertext which is very similar to ordinary text, except that for hypertext, connections to other parts of the text or to other documents can be hidden behind words and phrases. The connections to these hypertext are referred to as hypertext links and they allow the user to read the document in any order desired. WWW also utilizes hypermedia which allows links to connect to not only words but also with pictures, sounds and any other data files which can be stored on a computer.

More specifically, hypermedia is a method for connecting data files together regardless of their format. The hypermedia links held on a given WWW page describes the location of the document which a WWW browser should display by using a Uniform Resource Locator (URL). URLs enable WWW browsers to go directly to any file held on any WWW server. URL is a naming system, typically consisting of three parts, the transfer format (also known as the protocol type), the host name of the machine which holds the file (may also be referred to as the WWW server name) and the path name to the file. The transfer format for standard WWW pages is Hypertext Transfer Protocol (HTTP). Standard Internet naming conventions are utilized for the host name portion of the URL. UNIX® directory naming conventions are utilized to indicate the path name of the file.

A WWW browser may be used to send and receive data using HTTP as well as to access all of the popular Internet resources directly and through gateways which can be reached through the WWW. More specifically, a WWW browser is a client software which may be run on a computer able to access different resources including USENET, FTP, Archie, etc. from one common user interface. Currently there are various different WWW browsers available. The most well known WWW browsers are Mosaic® and its progeny such as NETSCAPE NAVIGATOR(®.

FIGS. 1a and 1b illustrate the prior art method and apparatus for accessing Internet's WVW using a conventional Web browser. PC 100 is one of the network of computers in WWW 102. PC 100 is a Web client and WWW 102 is a Web server. PC 100 has a conventional Web Browser running such as Mosaic 104 and its display device displays a text fragment 106 and picture 108. Picture 108 may be retrieved from WWW 102 through URL (Uniform Resource Locator) i.e. which is a special name enabling Web Browser 104 to go directly to any file held on any WWW server. Unfortunately, the prior art method and apparatus only allows the use of Mosaic® type applications (i.e. applications which allow a user to browse and to access the WWW 102). Any other applications such as Word for Windows® are not able to use a URL to directly access a file in WWW 102.

In FIG. 1b, PC 100 has CPU 110 coupled to memory 114. Memory 114 has Windows® 112 and Web Browser 104. Web Browser 104 retrieves data from WWW 102 using a URL. As was described earlier, the limitation of the conventional method and apparatus for accessing the Internet's WWW 102 is that only Mosaic® type applications are able to map a URL into WWW 102 to directly retrieve WWW documents and data.

It is therefore desirable to have a method and an apparatus which allow a broader scope of applications to access data in the WWW without having to alter the applications themselves.

BRIEF SUMMARY OF THE INVENTION

The method and apparatus of the present invention allows for all applications running on a computer which conform to the Object Linking and Embedding Application Programming Interface (OLE API) to automatically become capable of accessing World-Wide Web (WWW files of arbitrary type. The standard OLE API is extended to utilize Uniform Resource Locators (URL), the VWW global naming convention.

A method for accessing world wide web data from a computer using an OLE compliant application is by connecting the world wide web with the computer through a network. The computer has a processor, a memory having an operating system, the OLE compliant application, a presentation mechanism and a data access mechanism. A capability of communication is provided between the OLE compliant application and the world wide web using the presentation mechanism and the data access mechanism as a conduit between the OLE compliant application and the world wide web. The present invention uses an OLE surrogate server and an OLE surrogate container of the presentation mechanism for delivering world wide web data to the OLE compliant application.

DETAILED DESCRIPTION OF THE INVENTION

The method and apparatus of the present invention allows for all applications running on a computer which conform to the Object Linking and Embedding Application Programming Interface (OLE API) to automatically become capable of accessing World-Wide Web (WWW) files of arbitrary type. The standard OLE API is extended to utilize Uniform Resource Locators (URL), the WWW global naming convention.

Figure 1A:
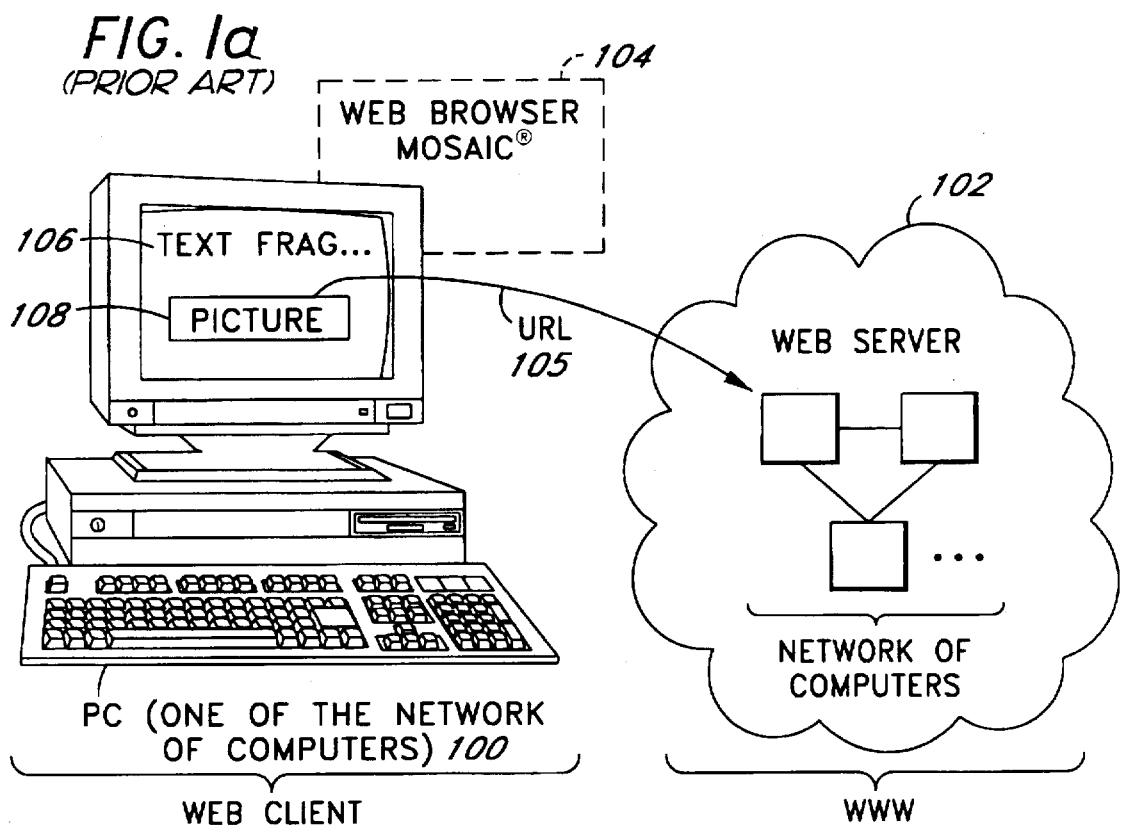
FIGS. 1a and 1b illustrate the prior art method and apparatus for accessing Internet's WWW using a conventional Web browser.
Figure 1B:
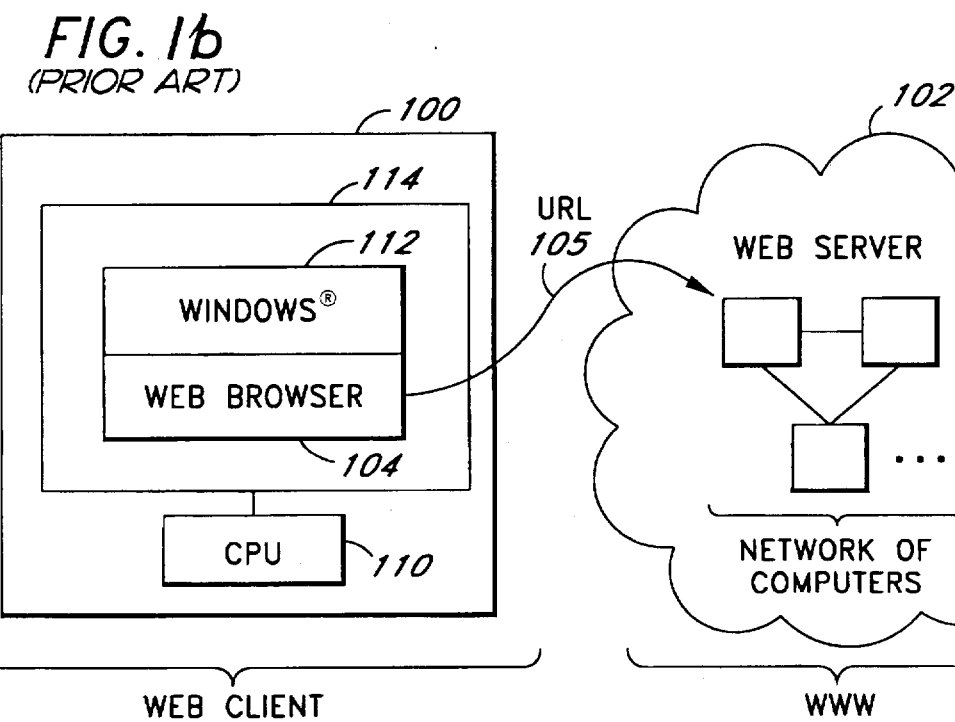
Figure 2A:
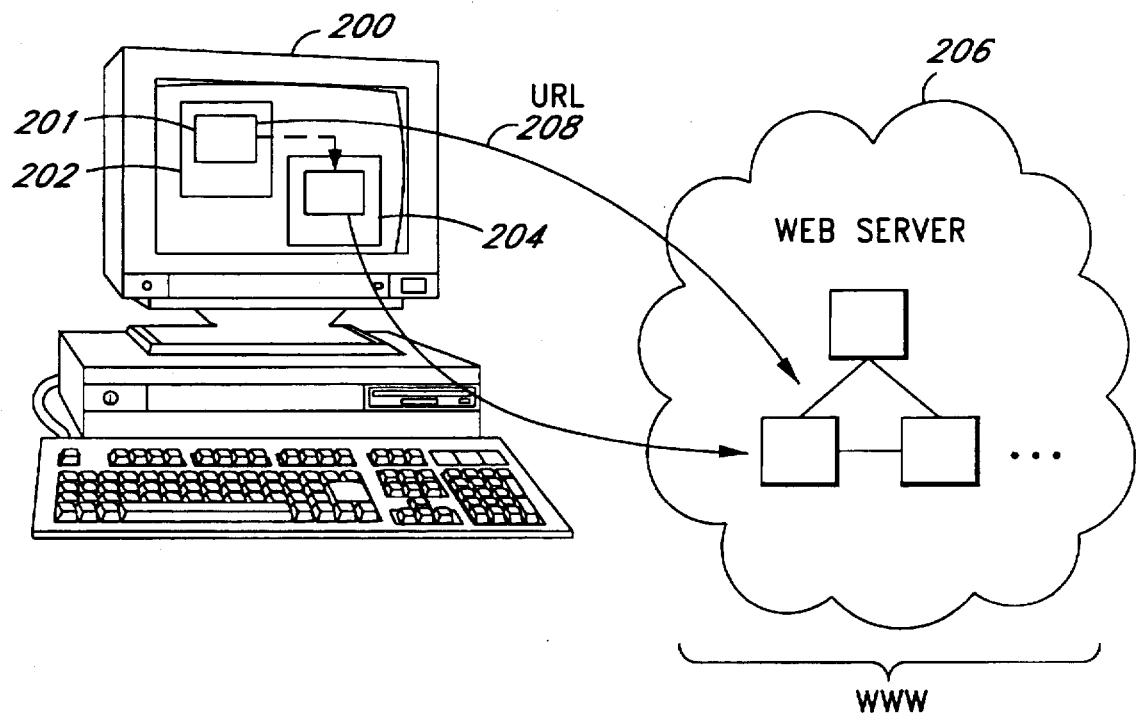
FIG. 2a represents a system block diagram illustrating computer 200 referencing a file residing in the Internet's WWW 206 using the method and apparatus of the present invention.
Figure 2B:
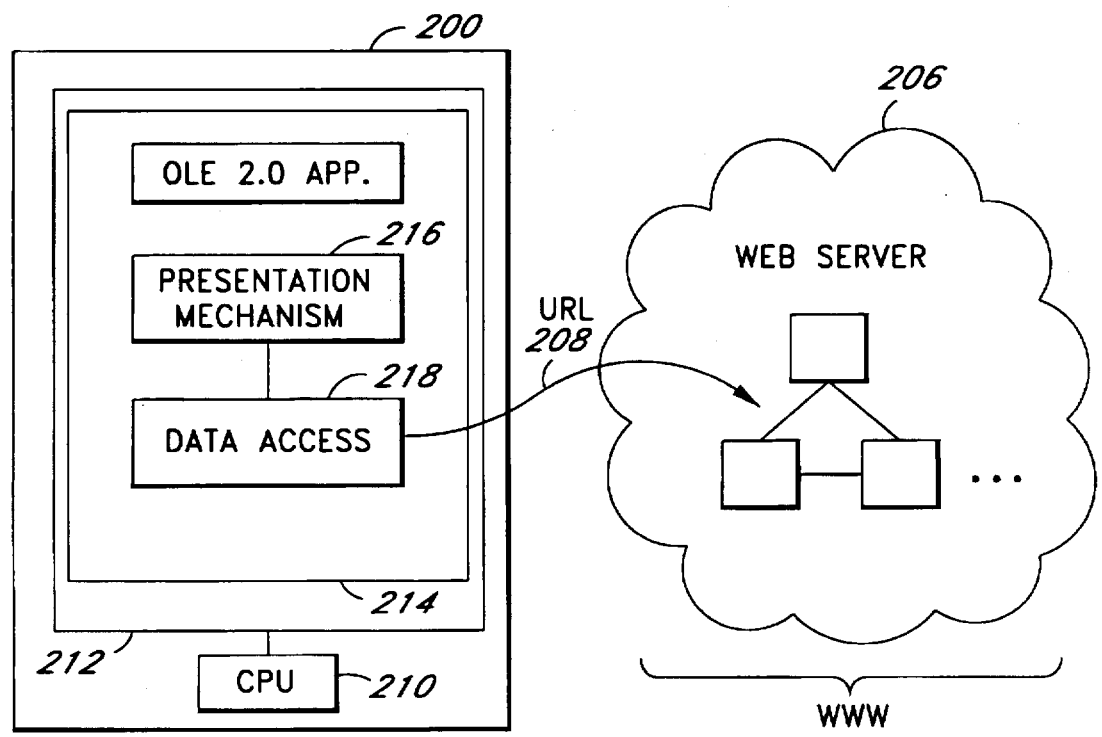
FIG. 2b is a system block diagram illustrating computer 200 running OLE applications with the extended features of the present invention.

FIG. 2b represents a system block diagram illustrating computer (PC) 200 referencing a file residing in the Internet's WWW 206 using the method and apparatus of the present invention. PC 200 has windows 202 and 204 displayed on the display device of PC 200. The applications producing the data displayed in windows 202 and 204 both conform to OLE API (Object Linking and Embedding Application Programming Interface) and may therefore be referred to as OLE compliant applications.

Object linking and embedding (OLE) technology enhances user interface which is already built into many popular software productivity applications. The mechanics of referencing documents by linking or embedding within documents is simple and well understood. Documents which may be embedded or linked using OLE are limited in scope and type since only files which are resident in the local file system or mounted network drives may be referenced. Referenced files need to have their format types entered in the operating system (namely Windows®) registry database to associate them with OLE applications which can read them. OLE applications which may read these files may be referred to as OLE servers.

Internet's WWW 206 is a collection of thousands of networks connecting millions of users at academic, industrial and government institutions worldwide. To access files from Internet's WWW 206, Uniform Resource Locator (URL) 208 is used. URL 208 consists of a syntactic encoding of names and addresses of objects and files on Internet's WWW 206. More specifically, URL 208 includes the protocol type being used to reference files in Internet's WWW 206, i.e. the server's name and the path name to the file where the object's contents reside.

In an exemplary implementation, applications 202 and 204 may be any OLE compliant application including applications capable of producing Word for Windows® documents. Data may be retrieved from WWW 206 using URL 208. Data 201 retrieved from WWW 206 may be dragged and dropped onto window 204. Thus once the data is retrieved from WWW 206, any OLE compliant application such as Word for Windows® may treat the data as any other type of data which it may manipulate.

FIG. 2b is a system block diagram illustrating computer 200 running OLE applications with the extended features of the present invention. PC 200 has CPU 210 and memory 212. Memory 212 has OLE application 214 running with Presentation Mechanism 216 and Data Access Mechanism 218. The capabilities of object linking and embedding technology are extended by the present invention to give the illusion that the WWW document is linked into an OLE container. OLE containers are OLE aware applications which are able to link or embed objects manufactured by OLE servers. Presentation Mechanism 216 is an extended OLE container and server. Data Access Mechanism 218 is responsible for the delivery of WWW documents when requested by Presentation Mechanism 216.

Figure 3:
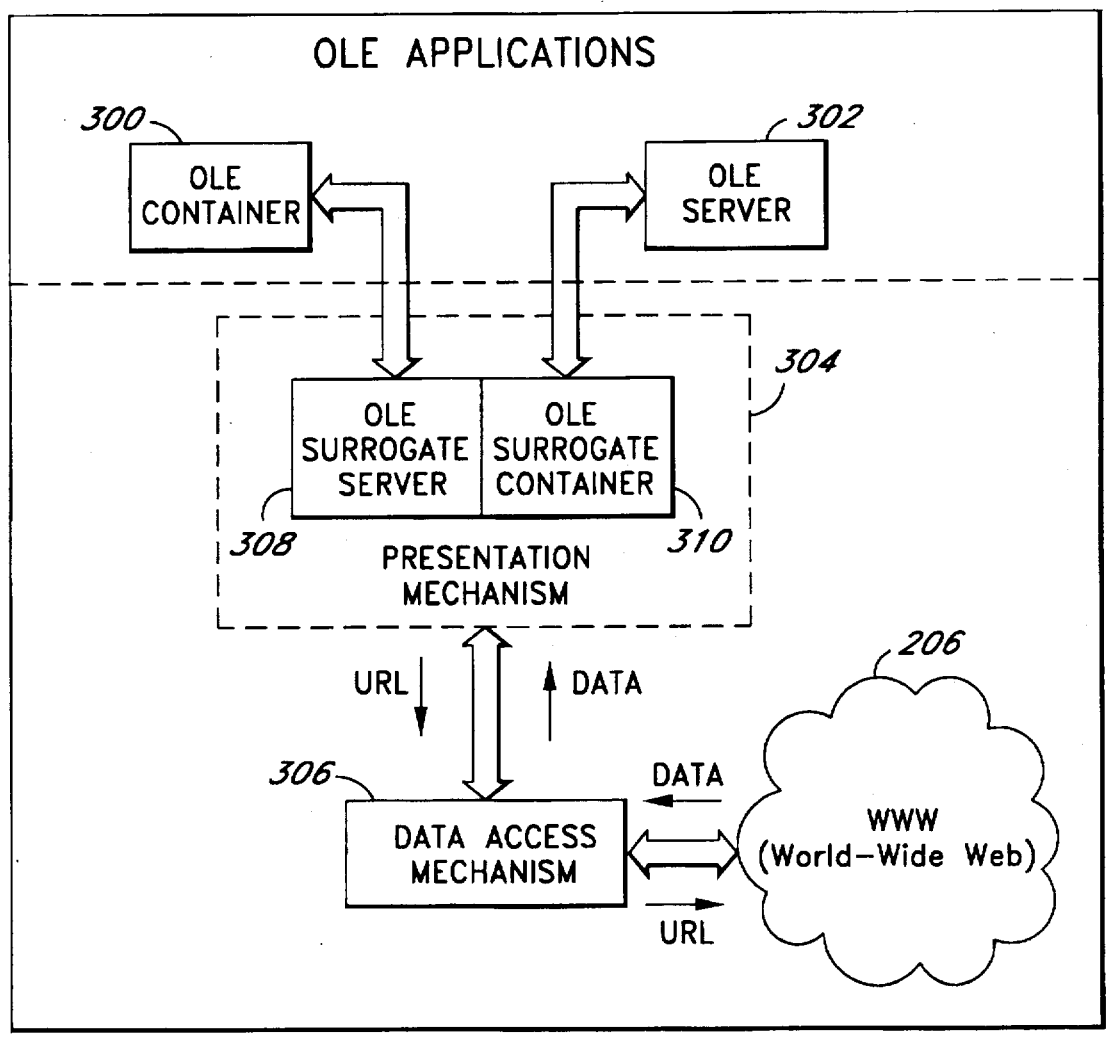
FIG. 3 illustrates exemplary components of the present invention.

FIG. 3 illustrates exemplary components of the present invention. As described earlier, the capabilities of Object Linking and Embedding technology (OLE 2.0) are extended to give the illusion that a WWW document is linked into an OLE Container. OLE Containers 300 are OLE-aware applications which are able to link or embed "objects" manufactured by OLE Servers 302. The extension to the OLE is referred herein as Presentation Mechanism (PM) 304. Data Access Mechanism (DAM) 306 is responsible for the delivery of WWW documents when requested by Presentation Mechanism 304.

Figure 6:
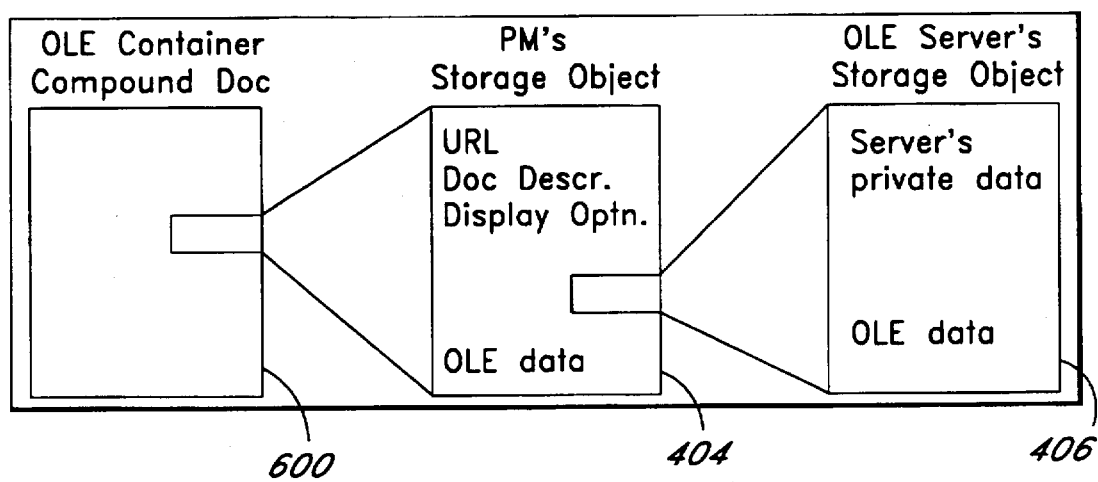
FIG. 6 illustrates an exemplary URL storage object.

In the present invention, a Presentation Mechanism object is embedded in OLE container 300 (illustrated in FIG. 6). Presentation Mechanism 304 acts as an OLE surrogate server 308 and OLE surrogate container 310 for a WWW document. When a user activates an embedded WWW document, OLE surrogate server 308 calls Data Access Mechanism 306 to create a local copy of the WWW document referenced by OLE surrogate server 308, OLE surrogate server 308 then determines which server application should be activated based on the type of WWW document and activates the real OLE server 302.

Presentation Mechanism 304 acts as a conduit between the container application and the real OLE server 302 such that they communicate with one another as though the real OLE server 302's document is directly embedded in the real OLE container 300. Thus, although Presentation Mechanism 304 acts as both OLE server 302 and OLE container 300 via OLE surrogate server 308 and OLE surrogate container 310, to the real OLE container application 300, Presentation Mechanism object 304 appears as the real OLE server 302. Further, to OLE server 302, Presentation Mechanism object 304 appears as the real OLE container 300. Thus, Presentation Mechanism 304 intercedes in the normal operation of OLE such that it may replace the URL with local files that OLE server 302 may handle.

The primary function of Data Access Mechanism 306, a Dynamic-Link Library (DLL), is to retrieve and store WWW documents. Presentation Mechanism 304 presents a URL to Data Access Mechanism 306 and in return receives a path name to a local file.

When presented to Data Access Mechanism 306, a URL is broken down into a protocol type, WWW server name and the path name to the file where the object's contents reside. The APIs provided by, for example, Windows® Sockets, may be used to establish the proper connection once the protocol is identified and established. The delivery of WWW files may then be initiated to the user's desktop.

Figure 4:
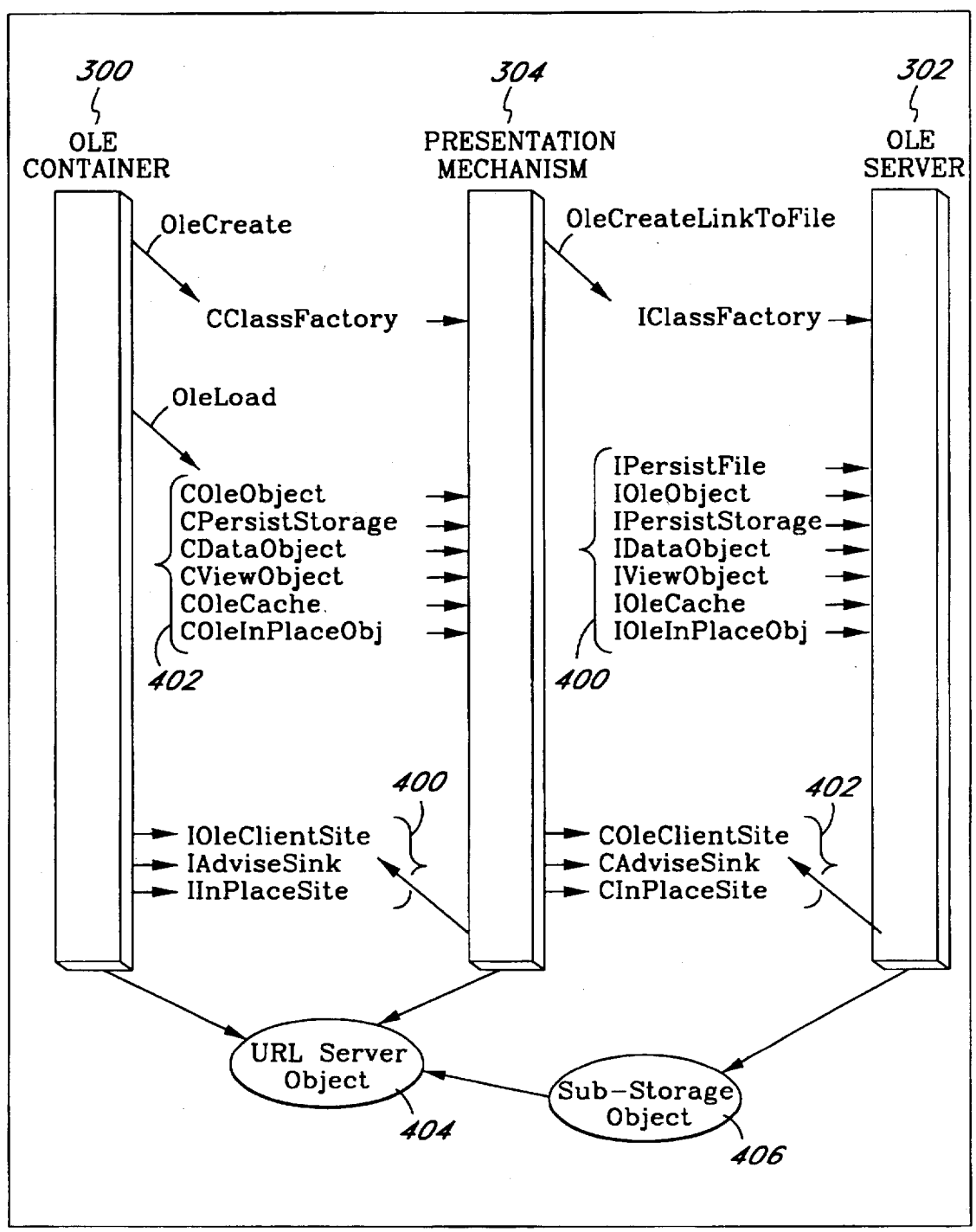
FIG. 4 illustrates standard OLE interfaces being intercepted by "C" prefixed classes.

FIG. 4 illustrates standard OLE interfaces being intercepted by "C" prefixed classes. An interface class is a set of semantically related functions implemented on an object. A method is a definition and implementation of those functions. An instantiation of interface classes is an array of pointers to those functions. For example, to obtain a pointer to an instantiated PM:COleObject interface, OLE container 310 calls PM::QueryInterface asking for a pointer to interface COleObject. This is an exemplary basic scheme which the OLE objects may use to communicate to each other and is well known in the art. "I" prefixed classes 400 are standard OLE interfaces. These standard interfaces are intercepted by "C"-prefixed classes 402.

OLE 2.0 interfaces 400 are intercepted by Presentation Mechanism 304. Presentation Mechanism 304 is both a container (i.e. OLE surrogate container 310) and a server (i.e. OLE surrogate server 308). Presentation Mechanism 304 stores the URL associated with the embedded object in URL storage object 404 supplied by OLE container 300. Sub-storage object 406 is supplied by OLE server 302 and is coupled to URL storage object 404.

OLE 2.0 interfaces 402 include CClassSactory interfaces used to create new instances of Presentation Mechanism objects and three container specific interfaces COleClientSite, CAdviseSink and CInPlaceSite. Presentation Mechanism 304 receives requests from OLE container 300 and passes them along to OLE server 302. Results are then returned to OLE container 300 as if they were received directly from OLE server 302. Presentation Mechanism 304 also accepts information from OLE server 302 and passes the information to OLE container 300.

With the method and apparatus of the present invention, standard OLE interfaces may be augmented to form an "extended OLE," applicable to accessing files from the Internet's WWW. From the user's point of view, complete transparency is obtained in accessing globally-located documents in WWW from any OLE compliant application. Documents handled by OLE applications may automatically become a hypertext document. For example, a text fragment within a document may be a URL object referencing a file in WWW.

Users using Windows® may use the File Save menu command to store the modified file to it's home location in the WWW (if the WWW server allows file modification). With the present invention's Data Access Mechanism 306, a Dynamic-Link Library (DLL) with exported C++ classes may be used for any client (whether it be OLE or non-OLE aware) needing access to WWW information. The present invention's Data Access Mechanism 306 is also protocol independent and may support HTTP and other Internet protocol's including FTP, Gopher, etc.

Figure 5:
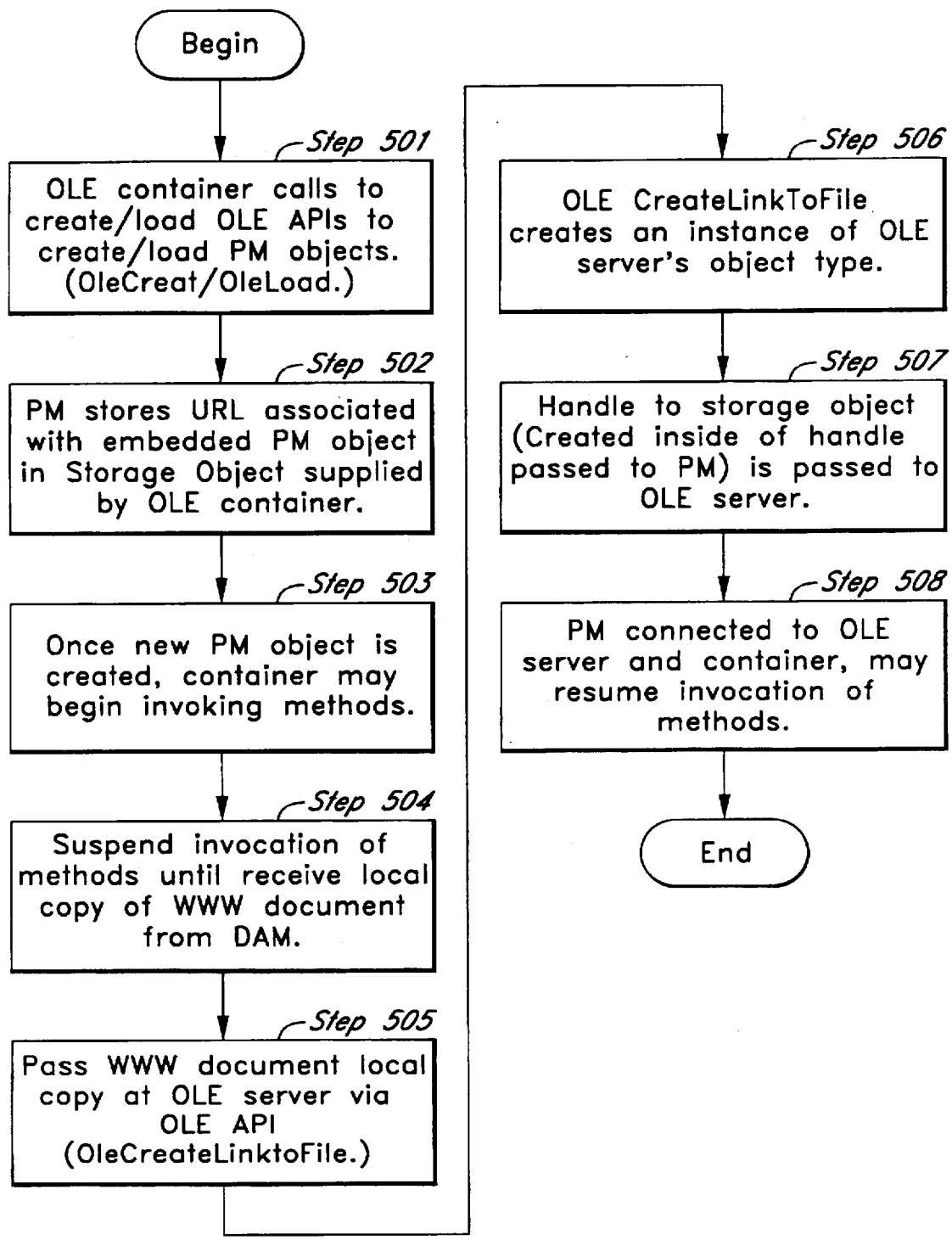
FIG. 5 is a flow diagram illustrating the general steps followed by the present invention in creating or loading Presentation Mechanism (PM) objects.

FIG. 5 is a flow diagram illustrating the general steps followed by the present invention in creating or loading Presentation Mechanism objects. In step 501, OLE container 300 calls the standard OLE APIs OleCreate or OleLoad, respectively. Most of these APIs pass a handle to a storage object (e.g. URL storage object 404) to Presentation Mechanism 304 (PM). In step 502, Presentation Mechanism 304 stores the URL associated with the embedded object in URL storage object 404 supplied by OLE surrogate container 310. In step 503, once the new Presentation Mechanism object is created, the Container application begins invoking methods. The methods used herein as mentioned earlier is defined as the implementation of a set of semantically related functions implemented in an object.

In step 504, Presentation Mechanism 304 suspends its process until it can apply a local copy of a WWW document from Data Access Mechanism (DAM) 306. In step 505, the path name of the local copy of the WWW document is passed to OLE server 302 through another OLE API, OleCreateLinkToFile. This interface creates an instance of OLE Server 302's object type in step 506. In step 507, a handle to a storage object created inside of the one passed to Presentation Mechanism 304 is passed to OLE server 302. In step 508, a connection is then made with OLE server 302 by Presentation Mechanism 304 and the Container application may resume invoking methods.

FIG. 6 illustrates an exemplary URL storage object. Presentation Mechanism 304's URL storage object 404 contains a document description and display option as well as OLE data. OLE container compound document 600 supplies an object to be embedded in URL storage object 404. OLE server storage object 406 serves as private data as well as OLE data. A handle to a storage object created inside of URL storage object 404 is passed to OLE storage object 406.

Figure 7:
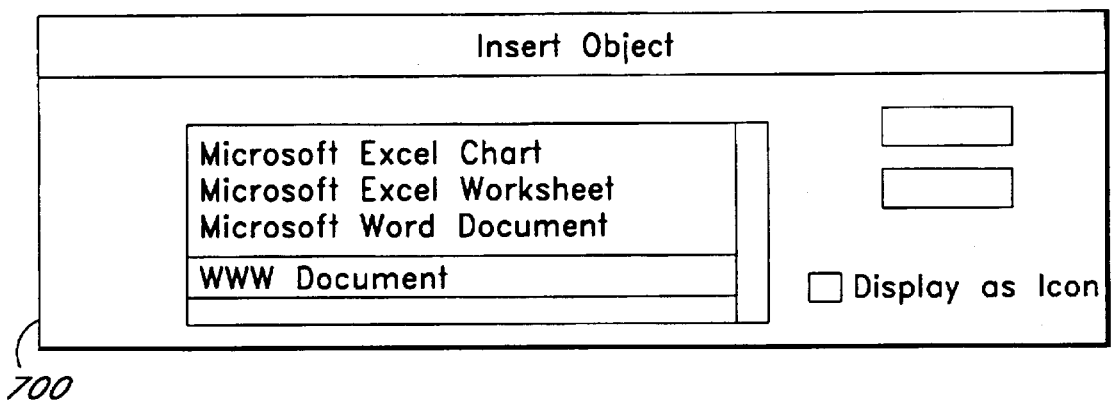
FIG. 7 illustrates an exemplary WWW document insertion dialog.

FIG. 7 illustrates an exemplary WWW document insertion dialog. Word for Windows® may be used in an exemplary implementation of the present invention. For example, a user can select the "insert" menu 700 which displays a dialog containing a list of objects which can be created. Presentation Mechanism 304 may be registered to appear in the menu list as "WWW Document" which may be selected by the user. When selected, a user is given an opportunity to enter a URL and the display method described below.

Figures 8, 9:
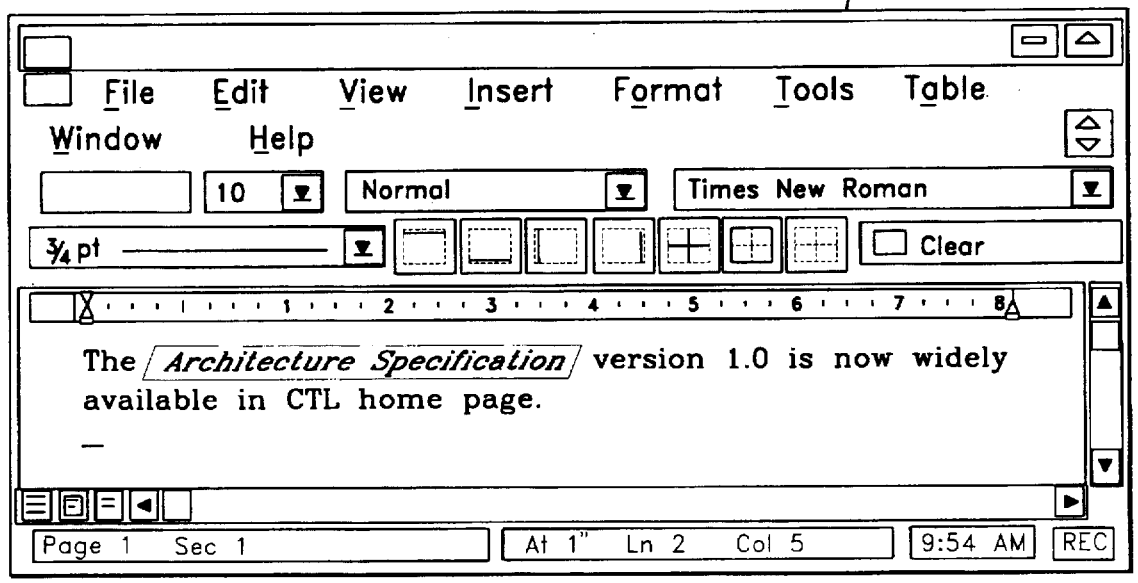
FIG. 8 illustrates an exemplary display method.
FIG. 9 illustrates an exemplary user's current document.

FIG. 8 illustrates an exemplary display method. Insert WW document 800 is displayed to the user. A click of an OK button to display the specified description such as architecture specification to the user's current document may be performed.

FIG. 9 illustrates an exemplary user's current document 900. Viewing an embedded URL object may be performed by double clicking on the specified description. This initiates the retrieval of the document as encoded in the specified URL. Upon completion of bringing the document to the user's machine, the appropriate application may be launched to view document. In this example, the document happens to be another Word for Windows® document and therefore another window within Word® is opened to view the "Architecture Specification".

Figure 10:
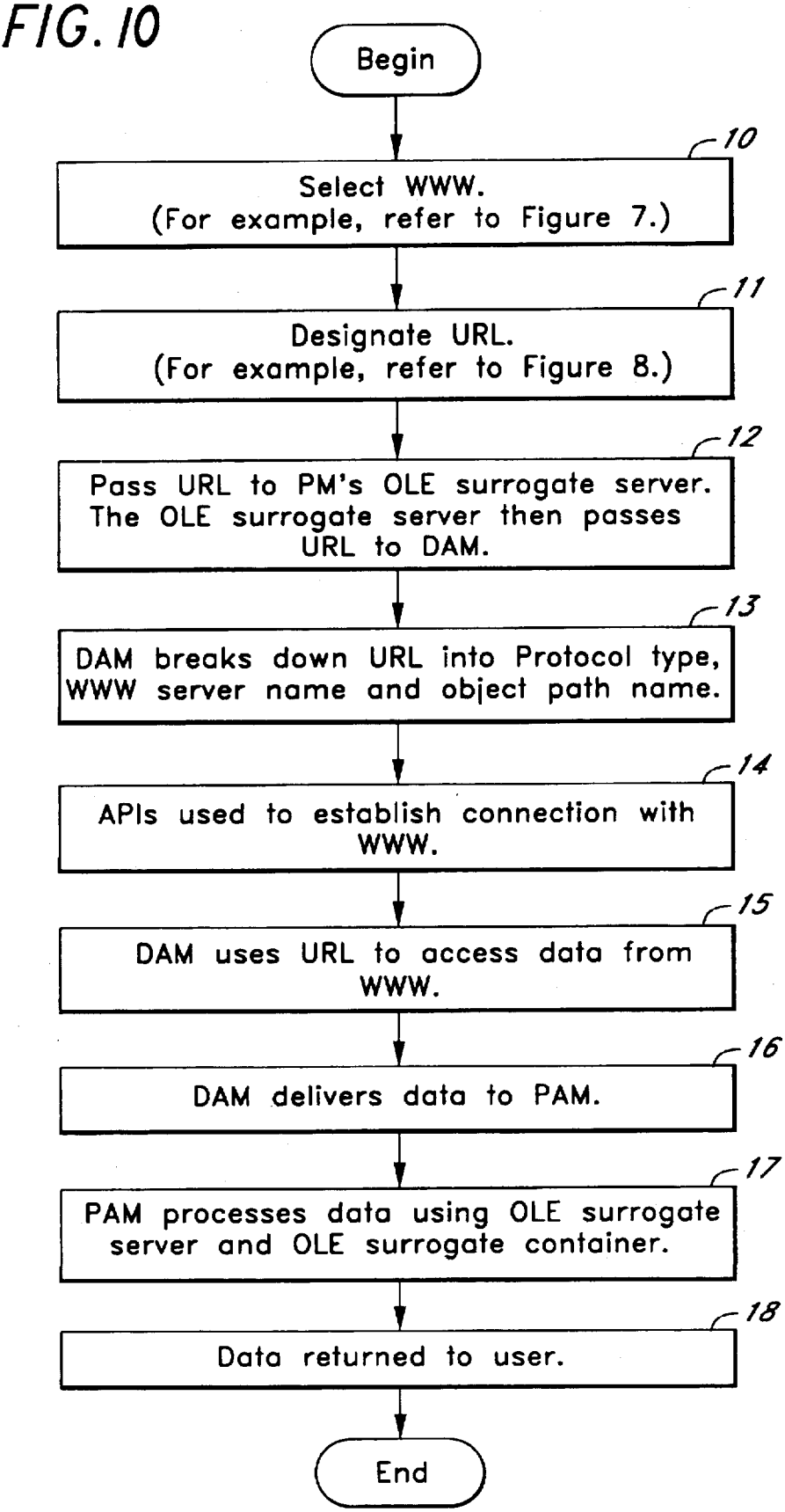
FIG. 10 illustrates the general steps followed by the method and apparatus of the present invention.

FIG. 10 illustrates the general steps followed by the method and apparatus of the present invention. In step 10, a user running an OLE compliant application such as Word for Windows® may bring up an insert object window (as was illustrated and described for FIG. 7). Presentation Mechanism (PM) 304 may be registered to appear in this menu as "WWW Document." This WWW Document option is selected. In step 11, the insert WWW Document menu appears and a URL designating the protocol type, the WWW server's name from which the date desired is to be retrieved and the path name to the data to be retrieved are input. In addition, the display method may be selected (as was illustrated in FIG. 8). In step 12, OLE container 300 transmits the URL to Presentation Mechanism 304's OLE surrogate server 308. OLE surrogate server 308 then passes the URL to Data Access Mechanism 306.

In step 13, Data Access Mechanism 306 breaks down the URL into a protocol type, WWW server's name and the path name to the file where the desired object's contents reside. In step 14, once the protocol is identified and established, APIs (Application Program Interfaces) provided by, for example, Windows® Sockets, may be used to establish the proper connection. In step 15, Data Access Mechanism 306 utilizes the URL to access the desired object/data from WWW 206. In step 16, Data Access Mechanism 306 delivers the WWW object/data to Presentation Mechanism 304. In step 17, OLE surrogate container receives the data and transmits the data to OLE server 302. OLE container 300, Presentation Mechanism 304 and OLE server communicate amongst each other using an array of pointers of an interface class as was illustrated in FIG. 4. In step 18, VWW object/data is displayed to the user.

What has been described is a method and an apparatus for accessing the Internet's WWW. A method and an apparatus of the present invention provide an extended OLE allowing for OLE applications to access documents in WWW. From the user's standpoint, there is complete transparency in accessing the WWW Documents from any OLE application. Thus, the OLE applications themselves do not have to be modified with the present invention.

While certain exemplary embodiments such as those using Windows® and URL's have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art. For example, the invention may be implemented with any remote naming mechanisms other than URL.

What is claimed:

1. A method for accessing world wide web data from a computer comprising:

requesting world wide web data, said requesting being performed by an OLE compliant application, said OLE compliant application being a non-browser type application incapable of accessing world wide web data using a uniform resource locator (URL) without support by a browser application, said OLE compliant application having an associated OLE container and OLE server;

embedding a URL in said OLE container in response to said requesting;

accepting said URL from said OLE container through an OLE surrogate server coupled to said OLE container, said accepting being performed transparent to and without modification to said OLE compliant application;

retrieving said world wide web data from said world wide web using said URL, said retrieving being performed transparent to and without modification to said OLE compliant application; and delivering said world wide web data to said OLE compliant application through an OLE surrogate container coupled to said OLE server, said delivering being performed transparent to and without modification to said OLE compliant application, said OLE surrogate container forwarding said world wide web data to said OLE server for receiving by said OLE compliant application.

2. The method of claim 1 wherein said step of providing further comprises the step of providing a capability of communication using said presentation mechanism and said data access mechanism as a conduit between said OLE compliant application and said world wide web.

3. The method of claim 1 wherein said step of connecting further comprises the steps of:

selecting world wide web from said computer;

designating an uniform resource locator associated with said world wide web data desired;

passing said uniform resource locator from said OLE container to said OLE surrogate server which in turn passes said uniform resource locator to said data access mechanism; and accessing said world wide web data from said world wide web using said uniform resource locator.

4. The method of claim 1 wherein said step of providing further comprises the step of coupling said OLE container and said OLE server of said OLE compliant application with said presentation mechanism using said operating system's OLE application programming interfaces.

5. The method of claim 1 wherein said step of retrieving further comprises the step of storing said world wide web data once it is retrieved, said storing being performed by said data access mechanism.

6. The method of claim 1 wherein said step of delivering further comprises the step of delivering said world wide web data to said presentation mechanism, said delivering being performed by said data access mechanism.

7. The method of claim 3 wherein said step of accessing further comprises the steps of breaking down said uniform resource locator into protocol type, world wide web server name and object path name, said breaking down being performed by said data access mechanism.

8. The method of claim 4 further comprising the step of creating a new presentation mechanism object.

9. The method of claim 6 further comprising the step of delivering said world wide web data from said presentation mechanism to said OLE server using said OLE surrogate container of said presentation mechanism to interface with and deliver said world wide web to said OLE server.

10. The method of claim 8 further comprising the steps of:

calling said OLE application programming interfaces to create and load said presentation mechanism object, said calling being performed by said OLE container;

storing a uniform resource locator associated with an embedded said presentation object in a storage object supplied by said OLE container, said storing being performed by said presentation mechanism; and invoking methods once said new presentation mechanism is created and said presentation mechanism is connected to said OLE server, said invoking being performed by said OLE container.

11. The method of claim 10 wherein said step of invoking further comprises the step of suspending invocation of methods until said presentation mechanism receives a local copy of said world wide web document from said data access mechanism, said suspending being performed by said presentation mechanism.

12. The method of claim 9 further comprising the step of receiving said local copy of said world wide web document from said data access mechanism, said receiving being performed by said presentation mechanism.

13. The method of claim 12 further comprising the steps of:

passing a local copy of said world wide web data to said OLE server through said OLE application programming interfaces, said passing being performed by said presentation mechanism;

creating an instance of said OLE server's object type using said OLE application programming interfaces; and passing a handle to said storage object to said OLE server, said handle being created inside a second handle passed to said presentation mechanism.

14. An apparatus for accessing world wide web data from a computer using an OLE compliant application comprising:

an OLE compliant application having an associated OLE container and OLE server, said OLE compliant application being a non-browser type application incapable of accessing world wide web data using a uniform resource locator (URL) without support by a browser application and embedding a corresponding URL in said OLE container, said request being processed without modification to said OLE compliant application through a presentation mechanism and a data access mechanism;

said presentation mechanism having an OLE surrogate container coupled to said OLE server and an OLE surrogate server coupled to said OLE container, said presentation mechanism for transmitting said world wide web data to said OLE server of said OLE compliant application through said OLE surrogate container and receiving said request for said world wide web data from said OLE container of said OLE compliant application through said OLE surrogate container; and said data access mechanism for retrieving and storing said world wide web data from said world wide web to said OLE surrogate container of said presentation mechanism, said data access mechanism coupled to said presentation mechanism.

15. The apparatus of claim 14 further comprising OLE application interfaces for coupling said OLE container and said OLE server with said presentation mechanism.

16. A computer system for accessing world wide web data from world wide web as requested by an OLE compliant application comprising:

a storage element which contains,
  a) an OLE compliant application having an associated OLE container and OLE server, said OLE compliant application being a non-browse type application incapable of accessing world wide web data using a uniform resource locator (URL) without support by a browser application and embedding a corresponding URL in said OLE container, said request being processed without modification to said OLE compliant application through a presentation mechanism and a data access mechanism;
  b) said presentation mechanism having an OLE surrogate container coupled to said OLE server and an OLE surrogate server coupled to said OLE container, said presentation mechanism for transmitting said world wide web data to said OLE server of said OLE compliant application through said OLE surrogate container and receiving said request for said world wide web data from said OLE container of said OLE compliant application through said OLE surrogate server, and
  c) said data access mechanism for retrieving and storing said world wide web data from said world wide web to said OLE surrogate container of said presentation mechanism, said data access mechanism coupled to said presentation mechanism; and a processor for running said presentation mechanism, said data access mechanism and said OLE compliant application, said processor coupled to said storage element.

17. The system of claim 16 wherein said storage element further comprises OLE application programming interfaces for interfacing said presentation mechanism with said OLE container and said OLE server.

18. A computer system for accessing world wide web data from world wide web as requested by an OLE compliant application without modification to the OLE compliant application comprising;

means for storing,
  a) means for transmitting having an OLE surrogate container coupled to said OLE server and said OLE surrogate server coupled to said OLE container, said means for transmitting and configured to transmit said world wide web data to an OLE server of said OLE compliant application through an OLE surrogate container and said request for said world wide web data from said OLE container of said OLE compliant application through an OLE surrogate server, said OLE conmpliant application being a non-browser type application incapable of accessing world wide web data using a uniform resource locater (URL) without support by a browser application,
  b) means for retrieving and storing said world wide web data from said world wide web to said OLE surrogate container, said means for retrieving coupled to said means for transmitting and means for running said means for transmitting, said means for retrieving and said means for having, said means for running coupled to said means for storing.

19. The system of claim 18 wherein said means for storing further comprises means for programming interfaces for interfacing said means for transmitting with said OLE container and said OLE server.

* * * * *

UNITED STATES PATENT AND TRADEMARK OFFICE
CERTIFICATE OF CORRECTION

PATENT NO.    : 5,896,533                                    Page 1 of 1
DATED         : April 20, 1999
INVENTOR(S)   : Ramos et al.

It is certified that error appears in the above-identified patent and that said Letters Patent is hereby corrected as shown below:

Column 1,
Line 49, delete "HITP" and insert -- HTTP --.
Line 57, delete "(".
Line 59, delete "WVW" and insert -- WWW --.

Column 2,
Line 26, delete "(WWW" and insert -- (WWW) --.
Line 28, delete "VWW" and insert -- WWW --.

Column 6,
Line 16, delete "WW" and insert -- WWW --.
Line 61, delete "VWW" and insert -- WWW --.

Signed and Sealed this

Second Day of December, 2003

JAMES E. ROGAN
*Director of the United States Patent and Trademark Office*